(12) United States Patent
Ito

(10) Patent No.: US 8,300,509 B2
(45) Date of Patent: Oct. 30, 2012

(54) RECORDING DETERMINATION APPARATUS AND RECORDING DETERMINATION PROGRAM

(75) Inventor: Kazunari Ito, Neyagawa (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 13/025,405

(22) Filed: Feb. 11, 2011

(65) Prior Publication Data

US 2011/0255382 A1 Oct. 20, 2011

(30) Foreign Application Priority Data

Apr. 15, 2010 (JP) ................. 2010-093730

(51) Int. Cl.
*G11B 7/00* (2006.01)

(52) U.S. Cl. .................................. 369/53.24

(58) Field of Classification Search ............... 369/30.11, 369/53, 24, 53.1, 53.2, 53.22, 275.3, 47.1, 369/47.27, 44.27, 44.28, 53.24
See application file for complete search history.

(56) References Cited

U.S. PATENT DOCUMENTS 6,704,252 B2 * 3/2004 Aso et al. .................. 369/30.11
2006/0072389 A1 4/2006 Matsumoto

FOREIGN PATENT DOCUMENTS

JP 2006-107581 4/2006

OTHER PUBLICATIONS

MAT (Machine assisted translation) of JP 2006-107581.*

* cited by examiner

*Primary Examiner* — Nabil Hindi
(74) *Attorney, Agent, or Firm* — Tucker Ellis LLP

(57) ABSTRACT

A movement device of a recording determination apparatus moves a pickup in a radial direction of an optical disc. The pickup irradiates laser light to the optical disc to output an electric signal, based on reflected light from a laser spot. A control device acquires address information relating to an arrangement position of the laser spot, based on the electric signal. The control device controls the movement device to move the laser spot from a data area to a recordable area. The control device determines whether or not data is recorded in the recordable area, based on the electric signal until a reference time has elapsed from a border potion between the data area and the recordable area, the border portion being specified based on the address information.

6 Claims, 7 Drawing Sheets

RECORDING DETERMINATION APPARATUS AND RECORDING DETERMINATION PROGRAM

BACKGROUND OF THE INVENTION

1. Field of the Invention

The present invention relates to a recording determination apparatus and a recording determination program, and more particularly to a recording determination apparatus and a recording determination program that determine whether or not data is recorded on an optical disc.

2. Description of the Related Art

An optical disc represented by a CD (Compact Disc) and a DVD (Digital Versatile Disc) has an annular data area in which data is recorded, such as a music track, a video track, and an image track. The optical disc further has annular recordable areas inside and outside the data area. Hereinafter, the recordable area inside the data area is referred to as an inside area, and the recordable area outside the data area is referred to as an outside area.

In these recordable areas, data can be recorded. For example, in the inside area of the CD, lead-in, which means session initiation, TOC (Table of Contents) and the like can be recorded. In the outside area of the CD, lead-out, which means closing of a session, can be recorded.

In the optical disc capable of rewriting data or recording data, the data may not be recorded in the recordable areas (the inside area and the outside area). For example, when the optical disc is a CD-R (Compact Disk Recordable), the lead-in, the TOC and the lead-out may not be recorded in view of a case where after music data is recorded, additional music data will be recorded.

An optical-disc reproducing apparatus normally executes reproduction processing, using the lead-in, the TOC and the lead-out. However, when these types of data are not recorded, the optical-disc reproducing apparatus executes the reproduction processing in another method, or notifies an error and does not execute the reproduction processing. In either of the operations, it is preferable that the optical-disc reproducing apparatus can determine whether or not the data is recorded in the recordable areas.

A conventional optical-disc reproducing apparatus determines whether or not the data is recorded in each of the recordable areas in the following method. For example, as disclosed in Japanese Patent Application Laid-Open No. 2006-107581, the optical-disc reproducing apparatus has an optical disc loaded, and then executes determination operation. In the determination operation, the optical-disc reproducing apparatus reads the TOC supposed to be recorded in the inside area. Specifically, the optical-disc reproducing apparatus, after having the optical disc loaded, moves a laser spot formed on a main surface of the optical disc by a pickup from the data area to the inside area to generate an RF signal. The optical-disc reproducing apparatus determines whether or not the data is recorded in the inside area, based on the RF signal.

However, when the data is not recorded in the inside area, the optical-disc reproducing apparatus repeatedly executes the determination operation. In the conventional optical-disc reproducing apparatus, a movement distance of the beam spot during the determination operation is long. Thus, the determination takes some time.

SUMMARY OF THE INVENTION

An object of the present invention is to provide a recording determination apparatus that determines whether or not data is recorded in a recordable area in a short time.

A recording determination apparatus according to the present invention that determines whether or not data is recorded in a recordable area in an optical disc including an annular data area and the annular recordable area arranged inside or outside the data area, in which data can be recorded. The recording determination apparatus comprises: a motor that rotates the optical disc; a pickup that irradiates laser light to the optical disc to form a laser spot on the optical disc, and to output a signal based on reflected light from an arrangement position of the laser spot; a movement device that moves the pickup in a radial direction of the optical disc; and a control device. The control device comprises: an acquirement unit that acquires address information relating to the arrangement position of the laser spot, based on the signal from the pickup; a movement control unit that controls the movement device to move the laser spot from the data area to the recordable area; and a determination unit that determines whether or not the data is recorded in the recordable area, based on the signal, until a reference time has elapsed from a border portion between the data area and the recordable area, the border portion being specified based on the address information.

Preferably in the optical disc, a pit line extending spirally is formed, and a plurality of pit line portions making up the pit line are arrayed in the radial direction in the optical disc. The determination unit comprises a number deciding unit that finds a number of the pit line portions arranged between the arrangement position of the laser spot and the recordable area, based on the address information. The determination unit determines whether or not the data is recorded until the reference time has elapsed since the laser spot passed the pit line portions of the found number.

Preferably the determination unit comprises a pit determination unit that determines the presence or absence of the pit line portion, based on the signal until the reference time has elapsed.

Preferably the recording determination apparatus further comprises an area determination unit that determines whether or not the area where the laser spot is arranged is the recordable area, based on the signal obtained from the laser spot arranged on the pit line portion, when it is determined that the pit line portion is present until the reference time has elapsed.

The recording determination apparatus according to the present invention determines whether or not the data is recorded in the recordable area, after moving the laser spot to the border portion between the data area and the recordable area. Thus, whether or not the data is recorded in the recordable area can be determined in a short time.

DETAILED DESCRIPTION OF THE PREFERRED EMBODIMENTS

Figure 1:
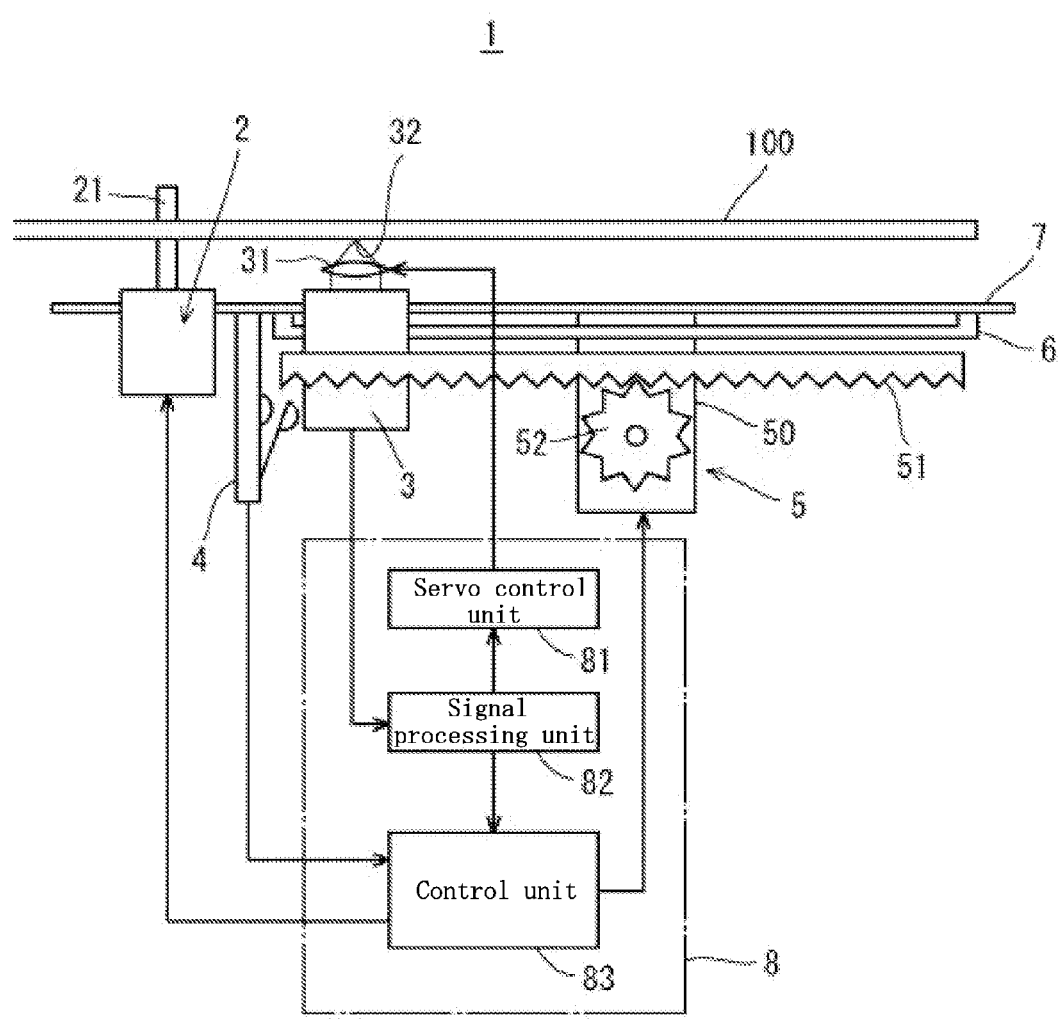
FIG. 1 is a diagram showing a configuration of a recording determination apparatus according to an embodiment of the present invention.

Hereinafter, referring to the drawings, an embodiment of the present invention is described in detail. The same reference numerals are given to identical units and corresponding units in the figures, the descriptions of which are not repeated.

[Overall Configuration of Recording Determination Apparatus]

FIG. 1 is a functional block diagram showing a configuration of a recording determination apparatus according to the present embodiment. The optical-disc reproducing apparatus that reproduces an optical disc includes a recording determination apparatus 1 shown in FIG. 1.

Referring to FIG. 1, the recording determination apparatus 1 includes a motor 2, a pickup 3, a switch device 4, a movement device 5, a rail 6 and a support member 7, and a control device 8.

The motor 2 is attached to the support member 7. The motor 2 is, for example, a spindle motor to rotate an optical disc 100. The motor 2 includes a shaft 21. The optical disk 100 is attached to the shaft 21.

The pickup 3 irradiates beam light to the optical disc 100 to receive reflected light from the optical disc 100. The pickup 3 further converts the reflected light to an electric signal and outputs the same. The pickup 3 includes an objective lens 31. The objective lens 31 moves in accordance with the electric signal outputted from the pickup 3. According to the movement of the pickup 3 itself and the movement of the objective lens 31, the beam light converges on a main surface of the optical disc 100 to form a laser spot 32 on the main surface of the optical disc 100. The pickup 3 is slidably supported by the rail 6. The rail 6 extends in a radial direction of the optical disc 100 and is attached to the support member 7. Accordingly, the pickup 3 can move in the radial direction of the optical disc 100.

The switch device 4 is attached to the support member 7. The switch device 4 outputs a switch signal to the control device 8 when coming into physical contact with the pickup 3. The switch device 4 is used to arrange the pickup 3 at an initial position when the recording determination apparatus 1 executes the determination processing.

The movement device 5 moves the pickup 3 in the radial direction of the optical disc 100. The movement device 5 includes a motor 50, a rack gear 51, and a pinion gear 52. The rack gear 51 extends in the radial direction of the optical disc 100. The rack gear 51 is attached to the pickup 3.

The motor 50 is attached to the support member 7. The pinion gear 52 is attached to a shaft of the motor 50. The motor 50 rotates in response to an instruction of the control device 8. The rotation of the motor 50 moves the pickup 3 in the radial direction of the optical disc 100.

The control device 8 includes a servo control unit 81, a signal processing unit 82, and a control unit 83. The signal processing unit 82 generates an RF signal, based on the electric signal outputted from the pickup 3. The RF signal is outputted to the control unit 83. The signal processing unit 82 further generates a lens control signal to move the objective lens 31, based on the electric signal. The lens control signal includes a focus error signal and a track error signal. The lens control signal is outputted to the servo control unit 81. The servo control unit 81 moves the lens 31, based on the lens control signal. A plurality of coils not shown are arranged around the objective lens 31 of the pickup 3. The servo control unit 81 controls electric power supplied to the coils in accordance with the lens control signal. The objective lens 31 moves in accordance with magnetic actions of the coils.

The control unit 83 controls the motor 2 to rotate the optical disc 100. The control unit 83 also controls the movement device 5 to move the pickup 3 in the radial direction of the optical disc 100. The control unit 83 obtains address information relating to an arrangement position of the laser spot formed on the main surface of the optical disc 100, based on the RF signal. The address information is, for example, time information or offset information with the head of data set to 0. In the present example, the address information is time information. The address information is included in a subcode. The control unit 83 further determines whether or not the data is recorded on the optical disc 100, based on the RF signal.

The respective substantial units 81 to 83 in the control device 8 may be configured as hardware. Alternatively, the control device 8 may be a computer including a central processing unit (CPU), a memory, and a hard disc, and the respective substantial units 81 to 83 maybe configured, based on a recording determination program.

[Configuration of Optical Disc]

Figure 2:
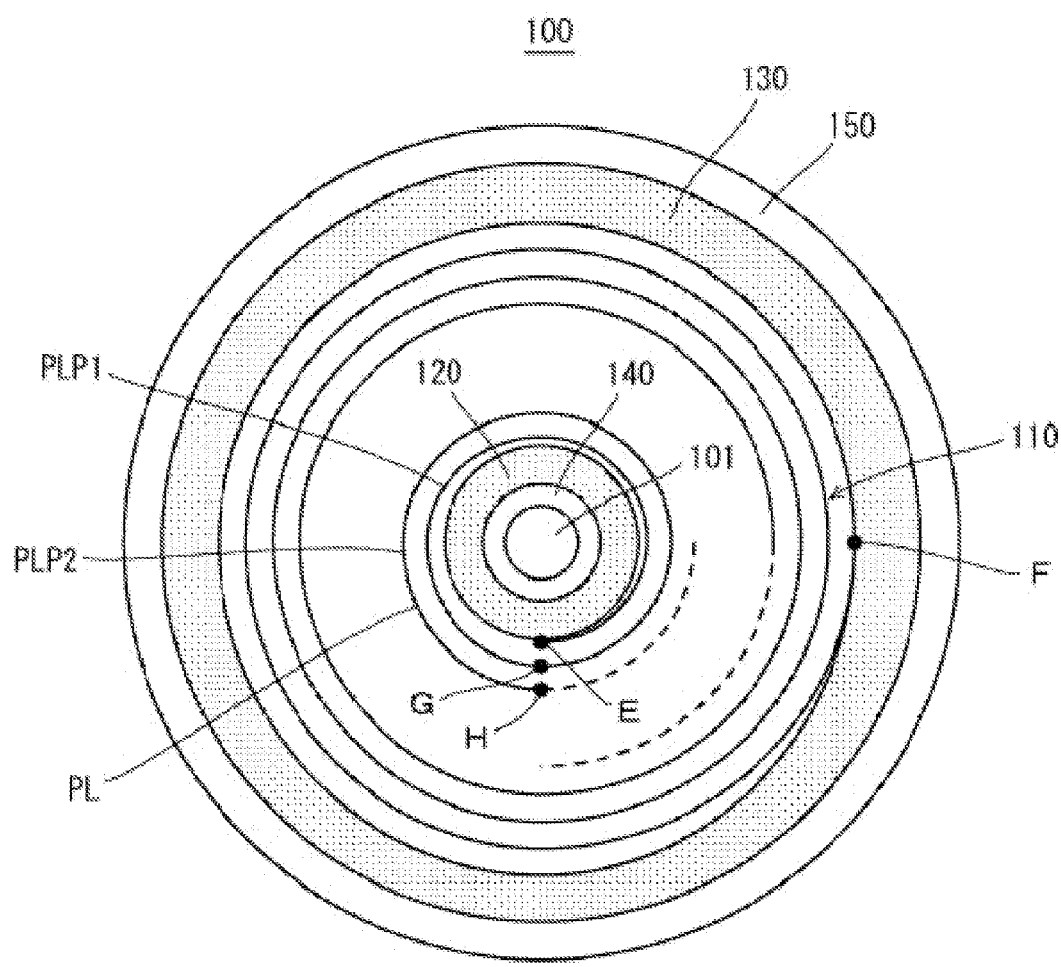
FIG. 2 is a diagram showing a structure of an optical disc in FIG. 1.

Referring to FIG. 2, the optical disk 100 has a through-hole 101 in the center, and is annular in shape. The optical disc 100 has a data area 110, recordable areas 120 and 130, and non-recordable areas 140 and 150. These areas 110, 120, 130, 140 and 150 are all annular. The optical disc 100 is, for example, a CD or a DVD.

In the data area 110, a pit line PL is formed. As shown in FIG. 2, the pit line PL spirally extends in a circumferential direction of the optical disc 100. The data is read in accordance with intensity of the reflected light of the laser spot 32 formed on the pit line PL. That is, the pit line PL corresponds to the data recorded on the optical disc 100.

Figure 3:
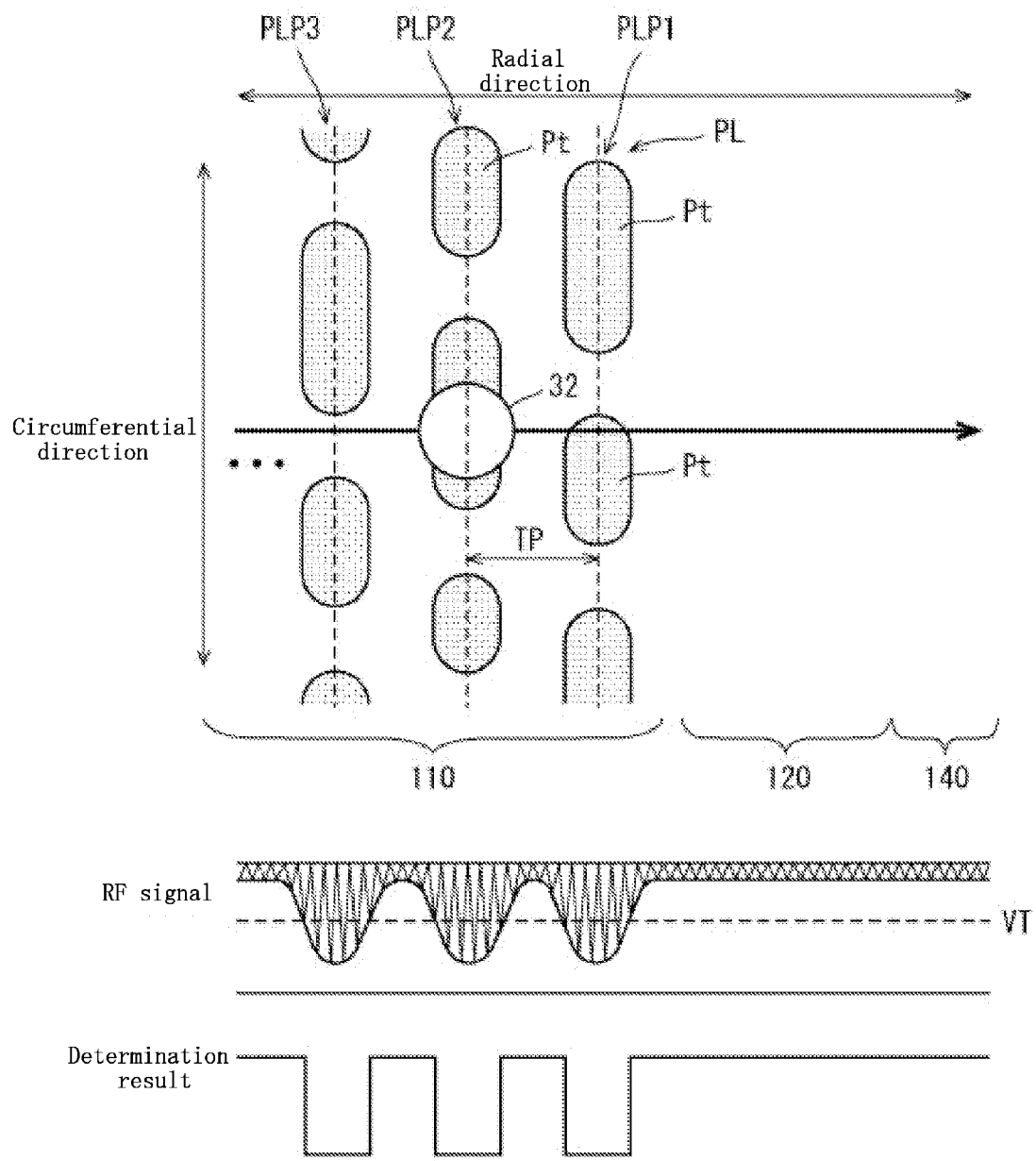
FIG. 3 is a diagram for explaining the determination of the presence or absence of data by the recording determination apparatus shown in FIG. 1.

FIG. 3 is a diagram in which a portion of the data area 110 is enlarged in FIG. 2. The pit line PL is made up of a plurality of pit line portions PLP1 to PLPn (n is a natural number). As described above, the pit line PL is spirally arranged. As shown in FIG. 3, the plurality of pit line portions PLP1 to PLPn are thus arrayed in the radial direction of the optical disc 100. The pit line portion PLPk (k is a natural number and $1 \leq k \leq n$) is arranged around PLPk-1, and has a length of one circuit. Specifically, referring to FIG. 2, the pit line portion PLP1 is arranged between a head E of the pit line PL, and a point G that is reached by making a circuit from the head E. The pit line portion PLP2 is arranged between the point G and a point H that is reached by making a circuit of the pit line portion PLP1 from the point G. Referring to FIG. 3, the pit line PL includes the plurality of pits PT. The plurality of pits PT are arrayed, and a gap is provided between the respective adjacent pits PT. A distance (track pitch) TP between the adjacent pit line portion PLPk-1 and pit line portion PLPk is defined in accordance with the type of the optical disc 100.

Referring back to FIG. 2, the recordable area 120 is arranged inside the data area 110. Hereinafter, the recordable area 120 is referred to as an inside area. In the inside area 120, data can be recorded. For example, in the inside area 120, lead-in and TOC are recorded. When the lead-in and the TOC are recorded, one or a plurality of pit line portions PLP are formed in the inside area 120 as well. The pit line portion (s) PLP makes up the above-described pit line PL. That is, the pit line portion(s) PLP formed in the inside area 120 connects to the other line portions PLP formed in the data area. When the data is not recorded in the inside area 120, the pit line portion(s) PLP is not formed in the inside area 120.

The recordable area 130 is arranged outside the data area 110. That is, the data area 110 is arranged inside the recordable area 130. Hereinafter, the recordable area 130 is referred to as the outside area 130. In the outside area 130, data can be recorded. For example, in the outside area 130, lead-out is recorded. Similar to the inside area 120, when the data is recorded in the outside area 130, the pit line portion(s) PLP is formed in the outside area 130. On the other hand, when the data is not recorded in the outside area 130, the pit line portion(s) PLP is not formed in the outside area 130.

The non-recordable area 140 is arranged on the further inner side of the inside area 120. The non-recordable area 150 is arranged on the further outer side of the outside area 130. In these non-recordable areas 140 and 150, no data can be recorded. The subcode obtained from the RF signal includes, in addition to the above-described address information, area information indicating the area (the data area 110, the inside area 120, or the outside area 130) of a point where the subcode is read.

[Operation Overview of Recording Determination Apparatus 1]

Operation overview of the recording determination apparatus 1 is described.

As described above, in the recordable areas (in the inside area 120 and the outside area 130) of the optical disc 100, the data may be recorded or may not be recorded. For example, when the optical disc 100 is a CD-R, in order to additionally record data in future, the lead-in, the TOC and the lead-out may not be recorded. The optical disc reproducing apparatus normally executes the reproduction processing, using the lead-in, the TOC, and the lead-out. However, when these types of data are not recorded, the optical-disc reproducing apparatus executes the reproduction processing in another method, or notifies an error and does not execute the reproduction processing. In either of the operations, it is preferable that the optical-disc reproducing apparatus can, in a short time, determine whether or not the data is recorded in the recordable areas 120, 130.

Figure 4:
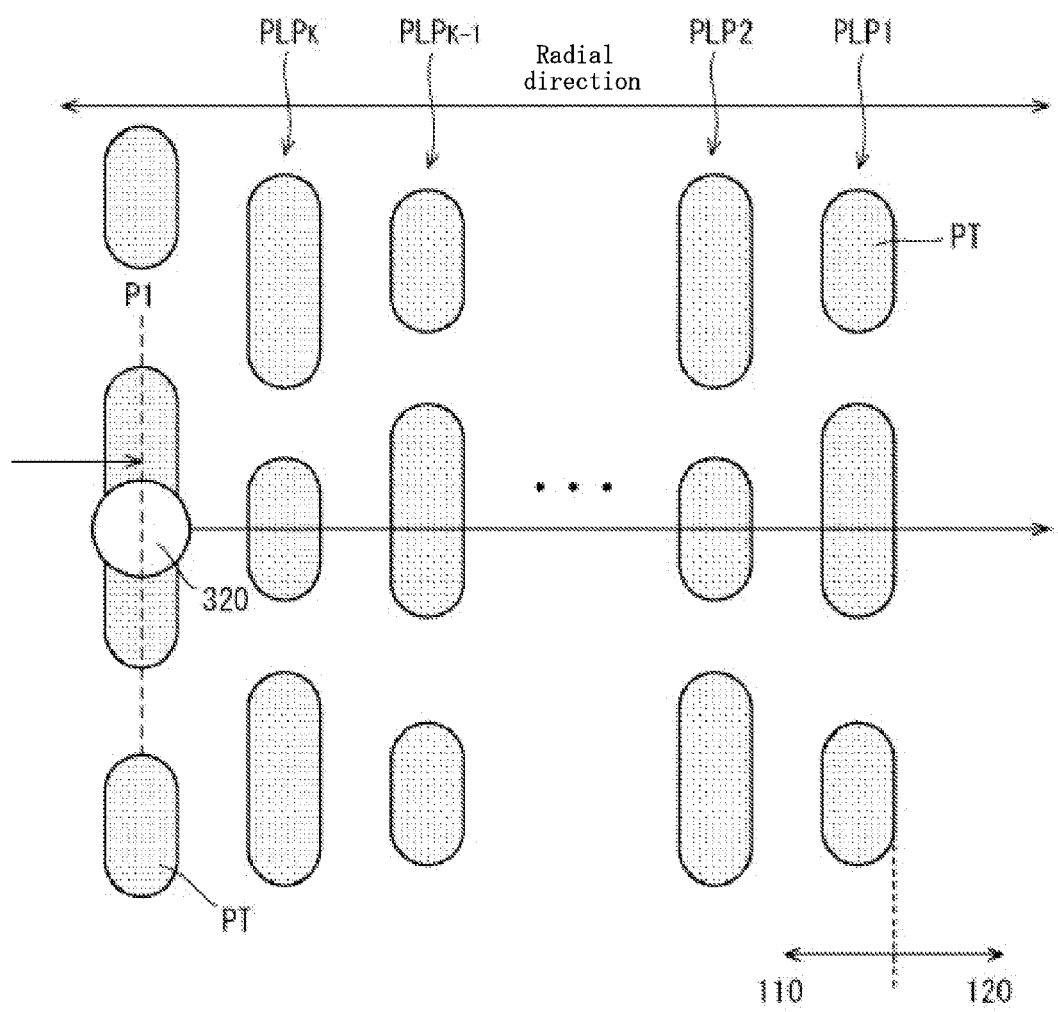
FIG. 4 is a schematic diagram for explaining one example of a method for determining the presence or absence of data in a recordable area of the optical disc shown in FIG. 2.

As a method for determining whether or not the data is recorded in the inside area 120, for example, there is a method shown in FIG. 4. First, the pickup is moved in the radial direction of the optical disc 100. When the pickup comes into physical contact with the switch device, the pickup temporarily stops. At this time, suppose that a laser spot 320 is arranged at a point P1 in the data area 110, as shown in FIG. 4. The switch device is arranged so that the point P1 is as close to a border between the data area 110 and the inside area 120 as possible.

Next, the objective lens is moved to move the laser spot 320 from the point P1 (in the data area 110) to the inside area 120. At this time, the laser spot 320 moves across the plurality of pit line portions PLP. Based on the RF signal acquired while the laser spot 320 is moving, whether or not the data is recorded in the inside area 120 is determined.

In the case where the presence or absence of the data recorded in the inside area 120 is checked by the above-described method, the laser spot 320 needs to cross the plurality of pit line portions PLP until the laser spot 320 moves from the point P1 to the inside area 120. In short, a distance from the point P1 to the inside area 120 is far. The determination thus requires some time.

When the determination takes some time, the following problems are caused. For example, if there is a region where dirt adheres between the point P1 and the inside area 120, the optical-disc reproducing apparatus determines that the data is not recorded in the region. In this case, the optical-disc reproducing apparatus cannot acquire the lens control signal, which makes it difficult to control the movement of the objective lens, thereby disabling the precise movement of the objective lens. Accordingly, when a start position of the determination processing is far from the inside area 120, the determination may take more time.

Even if an arrangement position of the switch device is adjusted, the distance between the point P1 and the inside area 120 is hardly reduced. The track pitch TP of the optical disc 100 is around 1 μm. Accordingly, it is difficult to adjust the arrangement position of the switch device 4 on the μm basis.

Figure 5:
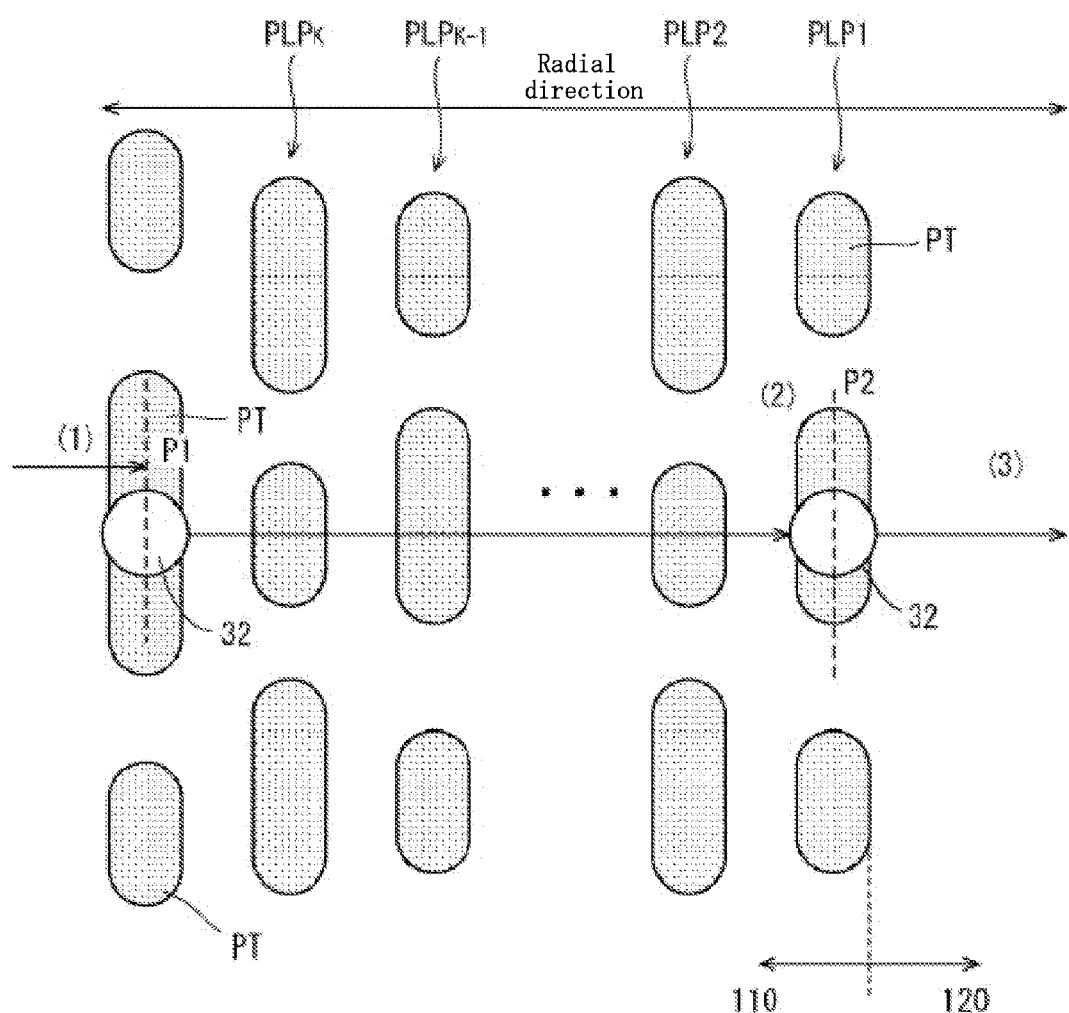
FIG. 5 is a diagram for explaining one example of the determination method by the recording determination apparatus shown in FIG. 1.

Consequently, the recording determination apparatus 1 according to the present embodiment brings the start position closer to the recordable area 120 by the following method. Referring to FIG. 5, the pickup 3 is first moved in the radial direction of the optical disc 100. The laser spot 32 is arranged at the point P1 by the switch device 4 ((1) in FIG. 5). Subsequently, the optical disc 100 is rotated to acquire the RF signal. Subsequently, the address information included in the RF signal is read. As described above, in the present example, the address information is the time information with the head E of the data area 110 set to 0, indicating an elapsed time when the optical disc 100 is rotated at a linear velocity defined by a standard of the optical disc 100 (CD or DVD).

A distance (radius) R between a center of the optical disc 100 and the head E of the data area 110 is defined by the standard. The linear velocity V is constant. Accordingly, in a vicinity of the head E in the data area 110, a time T1 required for one rotation of the optical disc 100 is defined by the following formula (1).

$$T1 = 2\pi R/V \tag{1}$$

If the address information (time information) obtained at a point that the laser spot 32 hits is T1 or less, the laser spot 32 is found to be arranged on the pit line portion PLP1 in less than one circuit from the head E.

Consequently, the recording determination apparatus 1 further moves the laser spot 32 from the point P1 where the laser spot 32 is stopped by the switch device 4 to the inside area 120. During the movement, the recording determination apparatus 1 continuously generates the RF signal to acquire the address information. The laser spot 32 is moved until the address information becomes T1 or less. The recording determination apparatus 1 stops the laser spot 32 at a point P2 where the address information becomes T1 or less ((2) in FIG. 5).

In short, the recording determination apparatus 1 moves the laser spot 32 to a border portion (the point P2) between the data area 110 and the inside area 120, based on the address information obtained at the point P1.

The recording determination apparatus 1 starts the determination processing at the point P2. Specifically, the recording determination apparatus 1 moves the laser spot 32 from the point P2 to the inside area 120 for a reference time to determine the presence or absence of the recorded data from the obtained RF signal ((3) in FIG. 5). In this case, the determination time is shorter than that by the method shown in FIG. 4. This is because a distance from the point P2 to the inside area 120 is remarkably shorter than the distance from the point P1 to the inside area 120.

According to the above-described method, in the recording determination apparatus 1, the determination time can be made shorter. As described above, when the pickup 3 cannot read the data (when the data is not recorded, or when the data is recorded, but the main surface of the optical disc 100 is contaminated), the servo control of the objective lens 31 is difficult, which may further increase the determination time. However, in the operation of the recording determination apparatus 1 according to the present embodiment, since the determination time is shorter, the increase of the determination time can be suppressed, as compared with the method in FIG. 4.

As described above, the recording determination apparatus 1 can reduce the time required for determining whether or not the data is recorded in the recordable areas 120 and 130. Hereinafter, details of the operation of the recording determination apparatus 1 are described.

[Details of Operation of Recording Determination Apparatus 1]

Figure 6:
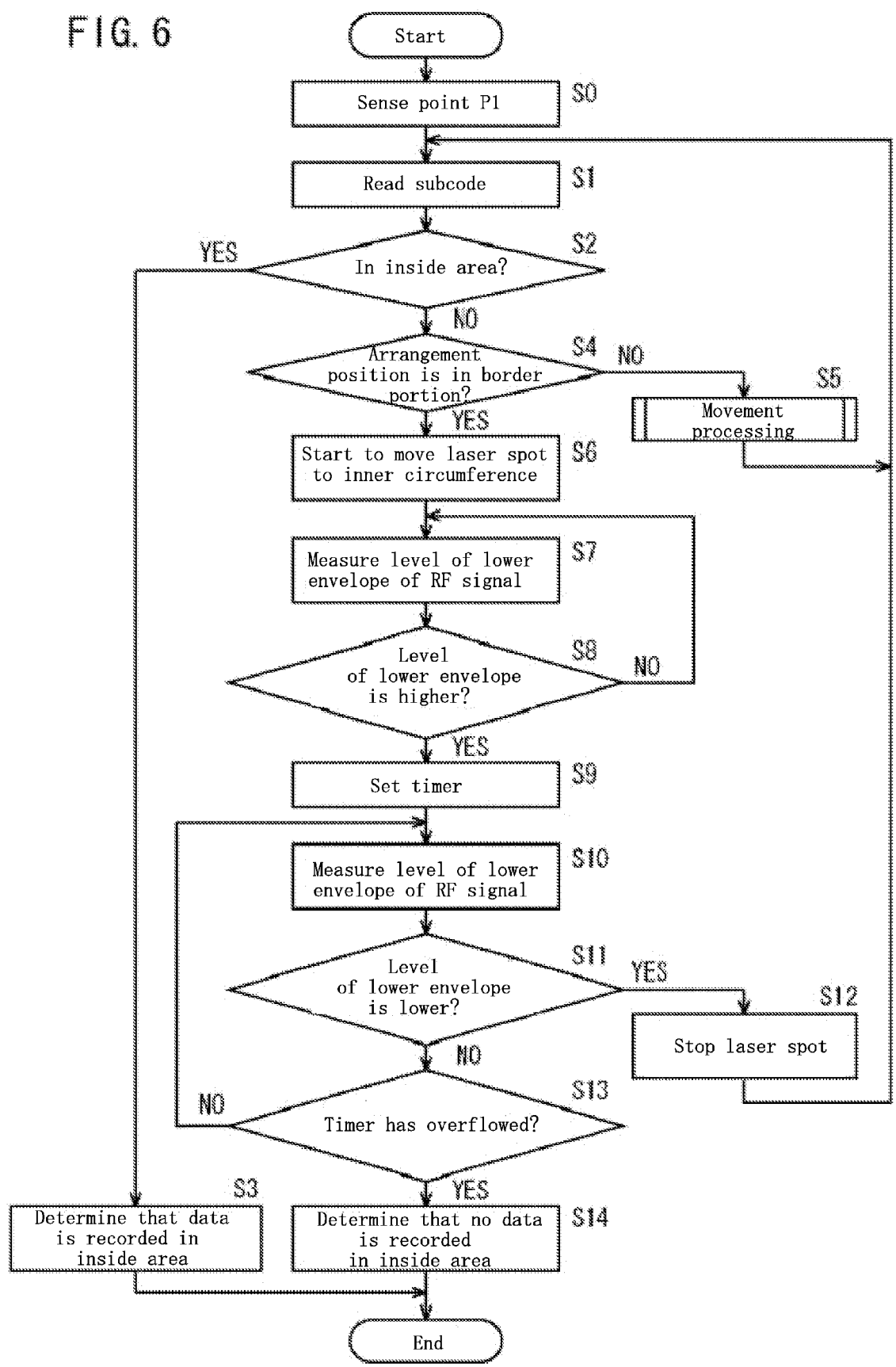
FIG. 6 is a flowchart showing details of operation of the recording determination apparatus shown in FIG. 1.

FIG. 6 is a flowchart showing details of the operation of the recording determination apparatus 1. The control unit 83 in the control device 8 first controls the movement device 5 to move the pickup 3 toward the center of the optical disc 100 in the radial direction. As a result of the movement, the pickup 3 comes into physical contact with the switch device 4. The switch device 4 outputs the switch signal to the control device 8 when coming into contact with the pickup 3.

Referring to FIG. 6, the control unit 83 in the control device 8, when receiving the switch signal, determines that the laser spot 32 has reached the point P1 (S0). Consequently, the control unit 83 reads the subcode at the current arrangement position of the laser spot 32 (here, at the point P1) (S1). Specifically, the control unit 83 controls the motor 2 to rotate the optical disc 100. Upon receiving the electric signal from the pickup, the signal processing unit 82 in the control device 8 generates the RF signal. The control unit 83 reads the subcode from the RF signal. As described above, the subcode includes the area information and the time information. The control unit 83 determines that the arrangement position of the laser spot 32 is in the data area 110, based on the area information (NO in S2).

The control unit 83 subsequently determines whether or not the current arrangement position of the laser spot 32 is in the border portion between the data area 110 and the inside area 120 (S4). The arrangement position of the laser spot 32 is on the pit line portion PLP. The control unit 83 determines whether or not the arrangement position of the laser spot 32 is within one circuit from the head E of the pit line PL, in other words, whether or not the arrangement position is within the pit line portion PLP1. In short, in the present example, the inside of the pit line portion PLP1 is defined as the "border portion".

Referring to FIG. 5, the point P1 is within the data area 110, but not in the border portion (NO in S4). Consequently, the control unit 83 controls the movement device 5 so as to further move the laser spot 32 toward the inside area 120 (S5: movement processing).

Figure 7:
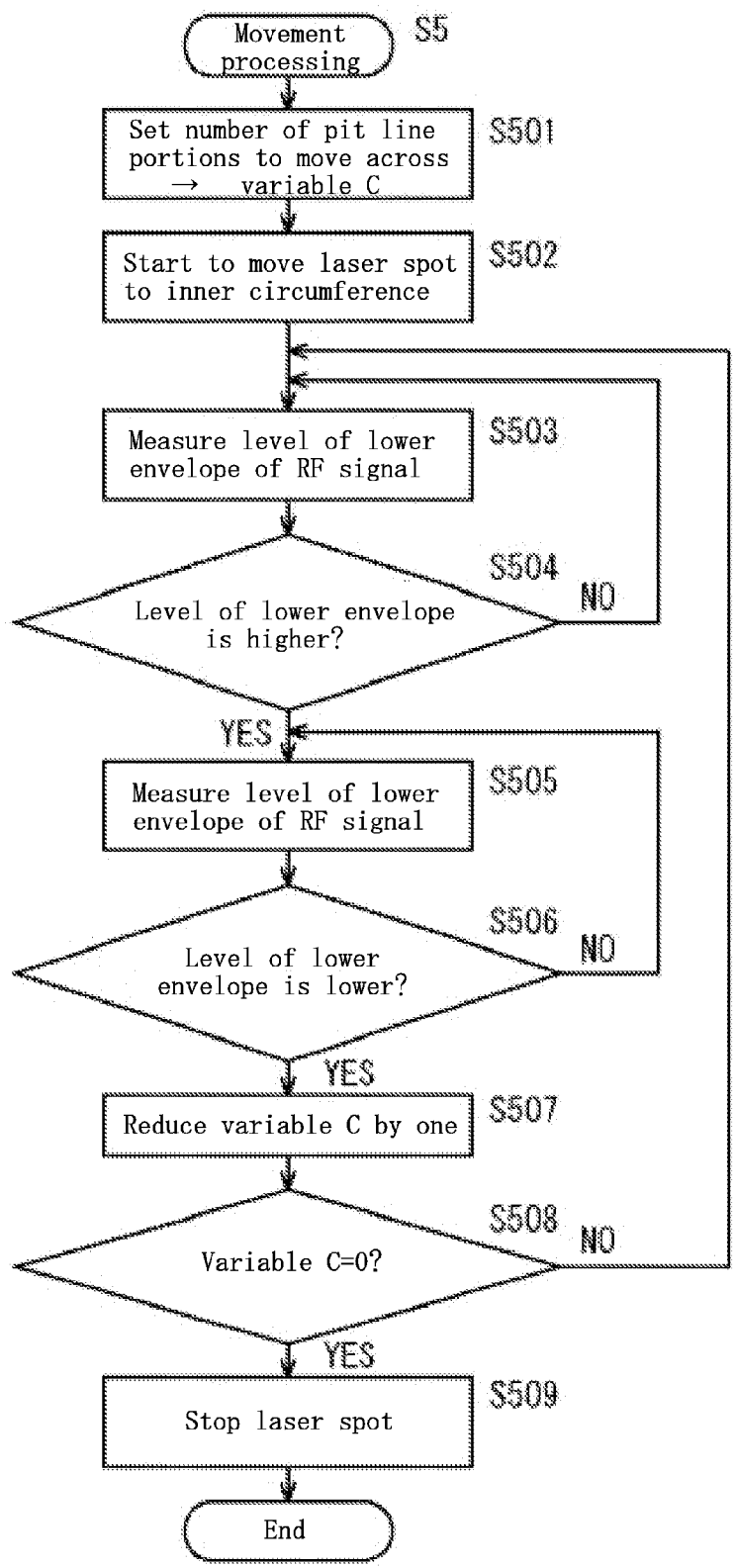
FIG. 7 is a flowchart showing details of operation of movement processing in FIG. 6.

FIG. 7 is a flowchart showing details of the movement processing in step S5. Referring to FIG. 7, the control unit 83 decides a movement amount of the laser spot 32, based on a position of the border portion specified based on the address information (S501). If the address information (time information) at the current arrangement position of the laser spot 32 is T2, the control unit 83 finds a number C of the pit line portions PLP to be crossed, based on a formula (2).

$$C = T2/T0 \quad (2)$$

Here, T0 is the time information at the rear end G of the pit line portion PLP1 (refer to FIG. 2), that is, the point that is reached by making a circuit from the head E in the pit line PL. Figures below the decimal point of a numerical value obtained by the formula (2) is truncated, and the resultant is the number C. The control unit 83 sets the number C as a variable.

The control unit 83 starts the movement of the laser spot 32, based on the variable C (S502). As shown in FIG. 3, when the laser spot 32 crosses the pit line portion PLPk (k is a natural number and $1 \leq k \leq n$), a level of a lower envelope of the RF signal changes. Specifically, when the laser spot 32 is arranged on the pit line portion PLPk, the level of the lower envelope of the RF signal becomes lower than a reference level VT, and when the laser spot 32 is arranged between the pit line portion PLPk and the pit line portion PLPk-1, that is, when it is arranged in a region other than the pit line portion PLP, the lower envelope of the RF signal becomes higher than the reference level VT.

Consequently, after step S502, the control unit 83 starts the measurement of the level of the lower envelope of the RF signal (S503). The control unit 83 determines whether or not the level of the measured lower envelope is higher than the reference level VT (S504). If the level of the lower envelope is lower than the reference level VT (NO in S504), the control unit 83 continues the measurement (S503).

If in step S504, the level of the lower envelope is higher than the reference level VT (YES in S504), the operation goes to step S505, in which the control unit 83 continues the measurement of the lower envelope (S505) and determines whether or not the level of the lower envelope is lower than the reference level VT (S506). If the level is lower (YES in S506), the laser spot 32 is found to cross one of the pit line portions PLPk. Consequently, the control unit 83 decrements the variable C to C−1 (S507), and the operation returns to step S503 to monitor the level of the lower envelope (S503). That is, the operation from step S503 to step S508 is repeated until the variable C becomes 0 (YES in S508).

When the variable C becomes 0 (YES in S508), the laser spot 32 passes the C pieces of pit line portions PLP arranged from the point P1 to the border portion, thereby being arranged in the border portion (at the point P2 on the pit line PLP1 in FIG. 5). Thus, the control unit 83 temporarily stops the movement of the laser spot 32 (S509) to end the movement processing in step S5.

Returning to FIG. 6, after ending the movement processing (S5), the control unit 83 acquires the subcode in the border portion (at the point P2) (S1). The control unit 83 determines whether or not the arrangement position of the laser spot 32 is in the inside area 120, based on the area information in the subcode (S2). If YES in step S2, it means that the data is recorded in the inside area 120. This is because if the data is not recorded, the pit line is not formed, so that the subcode cannot be read. Accordingly, in this case, the control unit 83 determines that the data is recorded in the inside area 120 (S3).

On the other hand, as a result of the determination in step S2, if the arrangement position of the laser spot 32 is in the data area 110 (NO in S2), the operation goes to step S4. Since the operation in step S5 has already been executed, the arrangement position of the laser spot 32 is in the border portion (at the point 2) (YES in S4). Consequently, the control unit 83 executes the determination processing (S6 to S13). That is, the control unit 83 starts the determination processing from the point P2.

The control unit 83 first controls the movement device 5 to move the objective lens 31 or the pickup 3 in the radial direction, thereby moving the laser spot 32 toward the inside area 120 (S6). At this time, the control unit 83 measures the level of the lower envelope of the RF signal (S7). When it is determined that the level of the lower envelope is higher than the reference level VT (YES in S8), that is, if the laser spot 32 leaves the pit line portion PLP1, a timer is set to a reference time ΔT (S9).

If a movement velocity of the laser spot 32 is Vs (μm/sec) and the track pitch is Dp (μm), a time T3 required for crossing the one pit line portion PLPk is defined by a formula (3).

$$T3 = Dp/Vs \quad (3)$$

Accordingly, the reference time ΔT set in the timer in step S9 is T3 or more. The reference time ΔT is less than a time required for the laser spot 32 reaching the non-recordable area 140 from the point P2. The control unit 83 starts the determination processing at the point P2. Thus, the presence or absence of the recorded data is determined until at least the time of T3 has elapsed, by which it can be determined whether or not the data is recorded in the inside area 120. Preferably, in view of allowance, the reference time ΔT set in the timer is about 3×T3 to 5×T3.

Until the timer overflows (YES in S13), that is, until the reference time ΔT has elapsed, the control unit 83 determines whether or not the data is recorded in the inside area 120, based on the RF signal (S10 to S13). Specifically, the control unit 83 monitors whether or not the level of the lower envelope of the RF signal becomes lower than the reference level VT (S10 and S11). If before the timer overflows, the level of the lower envelope becomes lower than the reference level VT (NO in S13, and YES in S11), there is a high possibility that the laser spot 32 is arranged on the pit line portion PLP in the inside area 120. Consequently, the control unit 83 stops the movement of the laser spot 32 (S12). The control unit 83 returns to step S1 to acquire the subcode from the RF signal (S1) and determines whether or not the current position of the laser spot 32 is in the inside area 120 (S2). If the current position is in the inside area 120 (YES in S2), it is determined that the data is recorded in the inside area 120 (S3).

On the other hand, if the timer overflows (S13), the control unit 83 determines that the data is not recorded in the inside area 120 (S14).

The above-described operation allows the recording determination apparatus 1 to determine, in a short time, whether or not the data is recorded in the inside area 120.

In the above-described embodiment, the recording determination apparatus 1 determines the presence or absence of the data in the inside area 120. The recording determination apparatus 1, however, can also check the presence or absence of the data in the outside area 130 by a method similar to the foregoing. In this case, in step S4 in FIG. 6, the recording determination apparatus 1 specifies a border portion between the data area 110 and the outside area 130, based on the address information of a rear end F (refer to FIG. 2) of the data area 110 and the address information of the current position of the laser spot 32. The border portion here is a pit line portion in one circuit from the rear end F. The control unit 83 moves the laser spot 32 in the radial direction toward an outer circumference of the optical disc 100, and until a reference time has elapsed since the laser spot 32 reached the specified border portion, the control unit 83 determines the presence or absence of the pit line portion PLP, based on the RF signal.

In the above-described embodiment, when the laser spot 32 reaches the border portion, the laser spot 32 temporarily stops (S509). However, after determining YES in step S508, the control unit 83 may execute the processing in step S1 without stopping the movement of the laser spot 32. In short, the control unit 83 may not stop the laser spot 32 when the laser spot 32 reaches the border portion.

While in the foregoing, the embodiment of the present invention has been described, the above-described embodiment is only illustrative for carrying out the present invention. Thus, the present invention is not limited to the foregoing embodiment, and can be carried out by appropriately modifying the above-described embodiment within a range not departing from the gist.

What is claimed is:

1. A recording determination apparatus for determining presence data is recorded in an annular recordable area of an associated optical disc including an annular data area arranged adjacent to the annular recordable area, the recording determination apparatus comprising:
   a motor that rotates the optical disc;
   a pickup that irradiates laser light to the optical disc to form a laser spot on the optical disc, and to output a signal based on reflected light from an arrangement position of the laser spot;
   a movement device that moves the pickup in a radial direction of the optical disc; and
   a control device, wherein the control device comprises:
      an acquirement unit that acquires address information relating to the arrangement position of the laser spot, based on the signal from the pickup, the address information specifying a border portion between the data and recordable areas of the associated optical disc;
      a movement control unit that controls the movement device to move the laser spot from the data area through the border portion and into the recordable area; and
      a determination unit configured to commence, when the laser spot is moved to the border portion, determining a presence of the data recorded in the recordable area, based on the signal, until a reference time has elapsed from a time the laser spot is first moved to the border portion between the data area and the recordable area.

2. The recording determination apparatus according to claim 1, wherein in the optical disc, a pit line extending spirally is formed, and a plurality of pit line portions making up the pit line are arrayed in the radial direction in the optical disc, the determination unit comprises a number deciding unit that finds a number of the pit line portions arranged between the arrangement position of the laser spot and the recordable area, based on the address information, and the determination unit determines whether or not the data is recorded until the reference time has elapsed since the laser spot passed the pit line portions of the found number.

3. The recording determination apparatus according to claim 2, wherein the determination unit comprises a pit determination unit that determines the presence or absence of the pit line portion, based on the signal until the reference time has elapsed.

4. The recording determination apparatus according to claim 3, further comprising an area determination unit that determines whether or not the area where the laser spot is arranged is the recordable area, based on the signal obtained from the laser spot arranged on the pit line portion, when it is determined that the pit line portion is present until the reference time has elapsed.

5. A recording determination program stored on a computer-readable medium that determines whether or not data is recorded in a recordable area in an optical disc including an annular data area and the annular recordable area arranged inside or outside the data area, in which the data can be recorded, the recording determination program causing a computer to execute the steps of:
   moving a pickup from the data area to the recordable area;
   acquiring address information relating to an arrangement position of a laser spot formed on the optical disc by the pickup, based on a signal generated in accordance with reflected light of the laser spot, wherein the address information specifies a border portion between the data area and the recordable area;

without determining whether or not the data is recorded in the recordable area, moving a pickup from the data area to the border portion; and while moving the pickup from the border portion to the recordable area, starting determining whether or not the data is recorded in the recordable area, based on the signal until a reference time has elapsed from a time the laser spot is first moved to the border portion.

6. A recording determination method that determines whether or not data is recorded in a recordable area in an optical disc including an annular data area and the annular recordable area arranged inside or outside the data area, in which the data can be recorded, the recording determination method including the steps of:

moving a pickup from the data area to the recordable area through a border portion between the data area and the recordable area;

acquiring address information relating to an arrangement position of a laser spot formed on the optical disc by the pickup, based on a signal generated in accordance with reflected light of the laser spot; and in accordance with the laser spot arriving at the border portion during the moving from the data area to the recordable area, starting determining whether or not the data is recorded in the recordable area, based on the signal until a reference time has elapsed from a time the laser spot is moved to the border portion, the border portion being specified based on the address information.

* * * * *